May 6, 1924.

S. QUIGLEY

CHUCK

Filed April 4, 1921

1,493,383

Inventor
S. Quigley
By Fowler & Kennedy
Attorneys

Patented May 6, 1924.

1,493,383

UNITED STATES PATENT OFFICE.

SAMUEL QUIGLEY, OF SALEM, MASSACHUSETTS.

CHUCK.

Application filed April 4, 1921. Serial No. 458,390.

*To all whom it may concern:*

Be it known that I, SAMUEL QUIGLEY, a citizen of the United States, residing at Salem, in the county of Essex and Commonwealth of Massachusetts, have invented a new and useful Improvement in a Chuck, of which the following, together with the accompanying drawings, is a specification.

The object of my present invention is to provide a chuck adapted for carrying grinding wheels such as are employed in dental laboratories and for other purposes. The grinding wheels employed in dental laboratories frequently have holes therethrough of different sizes, and in the present form of my improved chuck I provide means for centering the grinding wheels concentrically with the axis of the rotating spindle on which the wheels are carried.

The construction of my improved chuck is hereinafter described and illustrated in the accompanying drawings, in which—

Similar reference characters refer to similar parts in the different figures.

Figure 2:
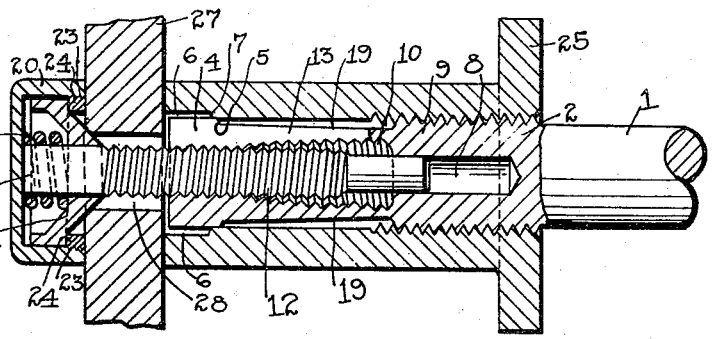
Fig. 2 is a central longitudinal view.
Figure 3:
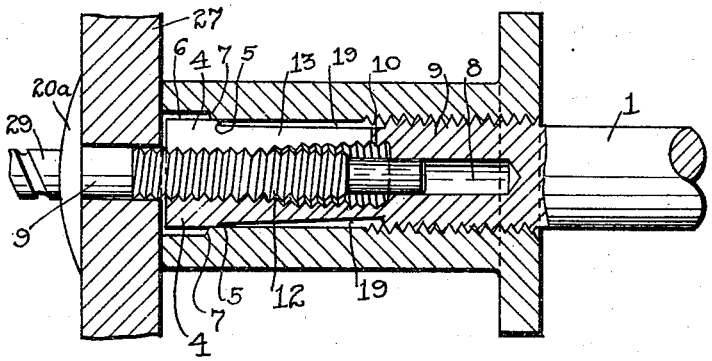
Fig. 3 is a central longitudinal view representing a construction of my improved chuck when the grinding wheels have holes therethrough of a uniform size.
Figure 4:
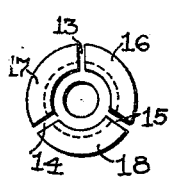
Fig. 4 is an end view of the chuck which is represented in detached sectional view in Fig. 5.
Figure 5:
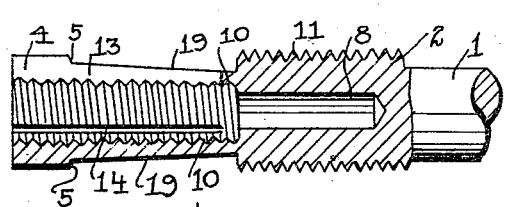
Fig. 5 is a detached sectional view of the chuck.

Referring particularly to Fig. 2 of the accompanying drawings, 1 denotes a rotatable arbor having a screw threaded section at 2 to receive an internal screw threaded sleeve 3. The rotatable arbor is provided with a slight enlargement 4 at its end, forming a shoulder 5, and the sleeve 3 has its inner diameter increased at 6 forming a shoulder 7. The arbor 1 is provided with a concentric hole 8 to receive a spindle 9. Between the concentric hole 8 and the enlarged end 4, the arbor is counterbored, as shown at 10, and the counterbored section is provided with an internal screw thread 11. The spindle 9 is provided with a screw threaded section 12. The arbor is provided with radial slits 13, 14 and 15 from the end of the arbor as far as the counterbore 10, thereby forming three compressible jaws 16, 17 and 18, Fig. 4. These jaws are gradually reduced in thickness from the end of the arbor as far as the counterbore 10, as represented at 19, in order to reduce their resistance to compression.

Figure 1:
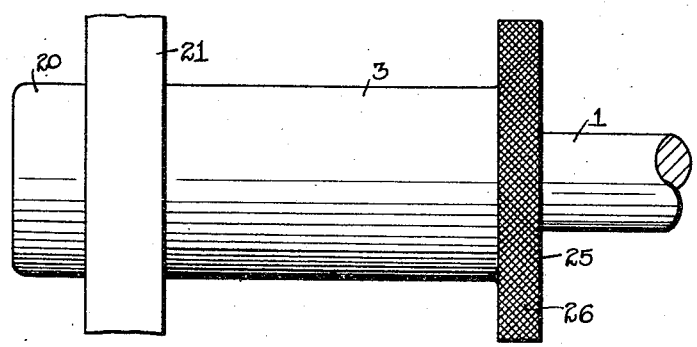
Fig. 1 is a side elevation of my improved chuck with a grinding wheel carried thereby.

The spindle 9 is provided with a hollow head 20, in the interior of which I place a cone 21, and between the cone and the bottom of the head is a spiral spring 22. The head 20 is provided with an internal screw thread 23 to receive a screw threaded collar 24, in order to prevent the spring 22 from forcing the cone 21 out of the head. The sleeve 3 is preferably provided at its end with a flange 25 having its outer surface knurled, as shown at 26, Fig. 1.

In order to apply a grinding wheel to the chuck, the sleeve 3 is unscrewed from the arbor until the shoulder 7 is withdrawn from the enlarged end 4 of the arbor, when the elasticity of the jaws 16, 17 and 18 will cause them to expand and withdraw the interior screw thread 11 from the screw threaded section 12 of the spindle, allowing the latter to be withdrawn and a grinding wheel 27 to be applied, with the cone 21 forced by the spring 22 into the opening 28 of the grinding wheel, thereby centering the latter.

The spindle 9 is then entered between the jaws of the chuck, arfd the sleeve 3 is screwed upon the arbor to cause the shoulder 7 to overlap the enlarged end 4 of the arbor. The continued movement of the sleeve 3 will bring it against the grinding wheel 27, forcing the latter firmly against the head 20.

In case the holes through the grinding wheels are uniform in size, the spindle 9 can be provided with a solid head 20ª, and the centering devices shown in Fig. 2 can be omitted. My improved chuck is designed to hold the spindle 9 in concentric position with the rotatable arbor 1, and it will be obvious that the head 20ª may be made integral with any suitable boring tool in alinement with the spindle 9, as for example, a twist drill 29 might be formed integral with the head 20ª, and the sleeve 3 in that case can be screwed firmly against the head 20ª.

I claim,

1. In an apparatus of the class described, the combination with a rotatable arbor having radial slits at its end to form the compressible jaws of a chuck, and having a concentric hole provided for a portion of its length with a screw thread, of a screw threaded spindle held in said compressible jaws and provided with a head, and a sleeve having a screw threaded connection with said arbor and a cylindrical plain interior surface at its end contacting with the outer surface of said compressible jaws.

2. In an apparatus of the class described, the combination with a rotatable arbor provided with a concentric hole counterbored and screw threaded at its end and having radial slits in its screw threaded section to form the compressible jaws of a chuck, of a spindle fitting the concentric hole of the arbor, and a sleeve having a screw threaded connection with said arbor, and an interior cylindrical surface contacting with the exterior of said compressible chuck jaws.

3. In an apparatus of the class described, the combination with an arbor having compressible elastic jaws, of a spindle held in said jaws having a head upon one end, and a sleeve having a screw threaded connection with said arbor and provided with a shoulder contacting with said compressible jaws, whereby a grinding wheel held on said spindle may be pinched between the end of the sleeve and the head of the spindle.

4. In an apparatus of the class described, the combination with a rotatable hollow arbor having elastic compressible chuck jaws, of a spindle held in said jaws having a hollow head at its end open on one side, a cone held in said head, a spring forcing said cone toward the open side of the head, a sleeve having a screw threaded connection with said arbor, and an interior shoulder contacting with the ends of said compressible jaws.

SAMUEL QUIGLEY.